April 13, 1926.  
J. H. CLARK  
1,580,812  
AUTOMATIC BRAKE APPLYING MECHANISM FOR TRAILERS  
Filed Nov. 17, 1922  2 Sheets-Sheet 1

Inventor  
James Harry Clark  
By his Attorney  
Ralph W. Flint.

April 13, 1926.
J. H. CLARK
1,580,812
AUTOMATIC BRAKE APPLYING MECHANISM FOR TRAILERS
Filed Nov. 17, 1922    2 Sheets-Sheet 2
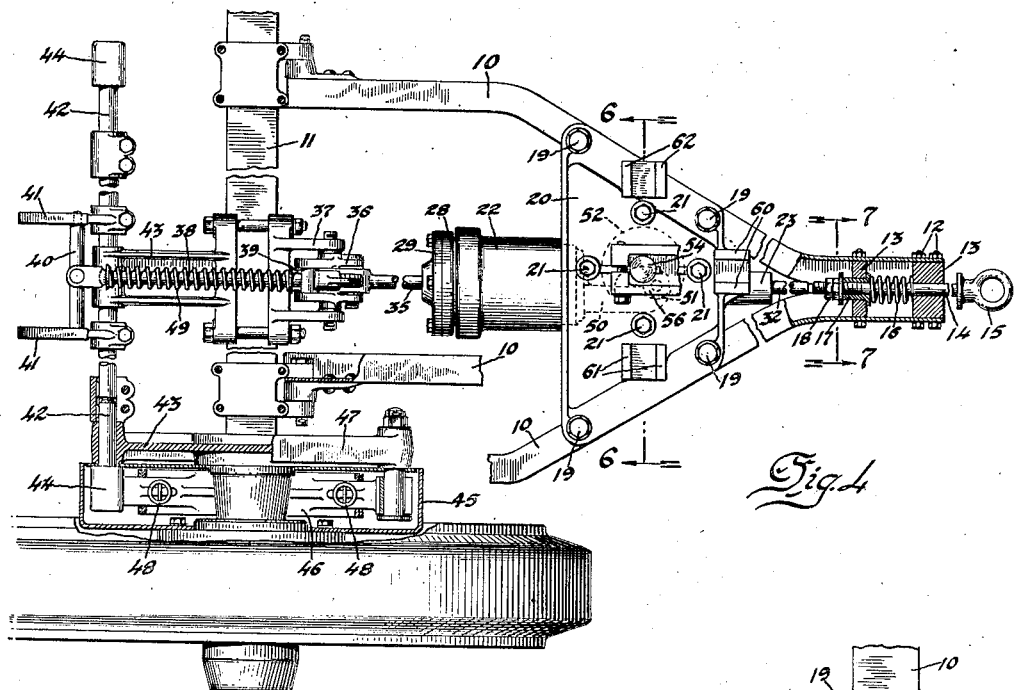
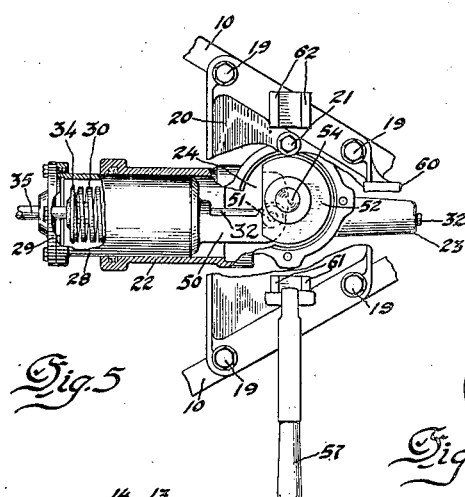
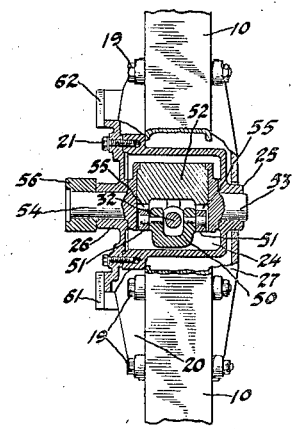
Inventor
James Harry Clark
By his Attorney Ralph N. Flint.

Patented Apr. 13, 1926.

1,580,812

UNITED STATES PATENT OFFICE.

JAMES HARRY CLARK, OF DETROIT, MICHIGAN.

AUTOMATIC BRAKE-APPLYING MECHANISM FOR TRAILERS.

Application filed November 17, 1922. Serial No. 601,559.

*To all whom it may concern:*

Be it known that I, JAMES HARRY CLARK, a citizen of the United States of America, and a resident of Detroit, in the county of Wayne and State of Michigan, have invented certain new and useful Improvements in and Relating to Automatic Brake-Applying Mechanism for Trailers, of which the following is a full, clear, concise, and exact description, such as will enable others skilled in the art to which said invention relates to make and use the same, reference being made therein to the accompanying drawings, which form a part of this specification.

My invention relates to trailers designed to be drawn by tractors, trucks, or like motor driven vehicles, and particularly to brake applying mechanism for the trailer designed to operate automatically to apply brakes to the trailer wheels if and when the trailer runs forward relative to the hauling vehicle, as when descending an incline; and the principal object of my invention is to provide improved automatically operating brake applying mechanism of the type or class, and for the purpose above stated.

A further object of my invention is to provide improved brake mechanism of the kind referred to and wherein means are provided for controlling the device manually; so that the brakes may be applied to the trailer wheels when it is unconnected with a hauling agency, and so also that the brakes may be prevented from operating if and when it is required to back the trailer by the tractor or other hauling agency.

With the above and other objects of invention in view my invention consists in the improved automatic brake mechanism illustrated in the accompanying drawings and hereinafter described and claimed; and in such variations and modifications thereof, within the scope of the concluding claims, as will be obvious to those skilled in the art to which my invention relates.

In the drawings accompanying and forming a part of this specification and wherein the preferred form of my invention is illustrated, and wherein the same parts and features are designated by the same reference numerals in the several views:

Figure 4 is a fragmentary view contracted in several respects showing my improved brake mechanism in its entirety, and in plan.

Figure 5 is a fragmentary plan view showing certain parts of my improved brake mechanism as operated by hand to apply the brakes.

Figure 6 is a view showing a section upon a vertical plane indicated by the line 6, 6, Figure 4, looking toward the left.

Figure 7 is a view showing a section upon a vertical plane indicated by the line 7, 7, Figure 4.

Figures 8 and 9 are views showing a certain cam of my improved brake mechanism separate and apart from other parts thereof.

Figure 1:
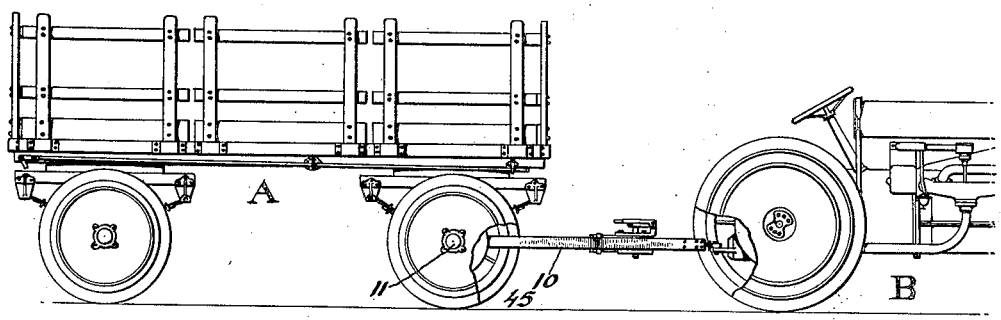
Figure 1 is a view showing in side elevation a trailer equipped with my improved brake mechanism, and drawn by a tractor.

Referring now to the drawings, the draw bar through which the trailer —A— is drawn from the tractor —B—, both of which may be of any desired type and construction, is made up of two spaced bars 10, 10 preferably channel shaped in cross-section; the rear ends of said members being connected with the forward axle 11 of the trailer from which they extend substantially parallel for a portion of their length, and are then inclined toward one another and then bent so as to extend alongside one another, thus providing a box-like structure at their front ends; where they are fastened together by cross bolts 12 and are properly spaced apart by spacing blocks 13, 13. These spacing blocks have aligned holes through which a longitudinally movable pull rod 14 having an eye 15 at its forward extremity, whereby connection with the tractor may be effected, extends; said pull rod forming a swivel connection and tractive force being transmitted therefrom to the draw bar through a spring 16 the front end of which abuts against the front spacer block, and the rear end of which abuts against a sleeve 17 slidable through an opening in the rear spacer block; said sleeve having stop flanges or collars at its two ends to limit its movement in both directions. The rear end of the pull rod is provided with a nut 18 from which it follows that tractive force exerted along the pull rod is communicated to the draw bar through the sleeve 17, the spring 16 and the forward spacer block; while at the same time the said pull rod may move relatively backward and freely through the spacer blocks if and when the trailer runs forward toward the tractor; as there is considerable space between the front face of the front spacer block and the eye 15.

Extending between the inclined portions of the draw bars 10, 10 and secured in place by bolts 19 is a supporting plate 20; and supported beneath and from this plate as by means of bolts 21 is a housing having a rear guide member shown as in the form of a cylinder portion 22, a front guide 23, and a chamber 24 between said parts within which a controlling cam to be hereinafter described operates; said cam being supported by trunnions rotatably supported in a lower bearing 25 carried by the housing, and in an upper bearing 26 provided in the plate 20; said cam being movable about a vertical axis and through an angle of 180 degrees as will hereinafter appear. A lower tie plate 27 extends between the inclined portions of the draft members beneath the housing aforesaid and is secured in place by the same bolts 19 which fasten the upper plate 20 in place; said bolts extending through both plates and through the upper and lower webs of the channel shaped draw bars as will be appreciated.

Movable longitudinally within the cylinder 22 is a hollow plunger 28 closed at its forward end, and having a removable head 29 at its rear end, and within which a spring 30 acting under compression is located. The forward end of this spring acts against an abutment 31 upon the rear end of a longitudinally movable strut bar 32 which extends through a bearing 33 in the front head of the plunger 28, through the chamber 24 and bearing 23 and to a position close to the rear end of the pull rod 14 when said rod is held in its rearmost position by the spring 16 acting through the sleeve 17 and nuts 18; movement of said sleeve in both directions being limited by flanges at the ends thereof which engage the front and rear sides of the rearmost spacing block 13, as will be understood from Figure 4 of the drawings. The rear end of said spring 30 acts against an abutment 34 upon the forward end of a brake applying rod 35 extending through the head 29 of the plunger 28 and through which, the same then acting as a strut under compression, brakes are applied to the front wheels of the trailer if and when, as when going down hill, the trailer starts to run forward under the action of gravity.

The particular form, construction and mode of operation of the brake mechanism with which the front wheels of the trailer are equipped is not directly involved in the invention to which this present application relates, and various particular forms thereof may be used. Also, and while I have referred to and will describe brake mechanism as associated with the front wheels of the trailer, the push rod 35 may if desired serve to operate brake mechanism associated with the rear wheels of the trailer, or with both the front and the rear wheels; as my invention contemplates nothing further by way of construction and arrangement or other details of brake mechanism than that suitable brake mechanism for the trailer shall be operated by the said push rod if and when the trailer runs forward upon the tractor as hereinbefore explained.

In the suitable brake mechanism illustrated, however, the rear end of the brake applying rod 35 pushes against the lower end of a lever 36 which is pivotally supported from a bracket 37 secured to the front axle 11, and the upper end of which is connected with the forward end of a tension link 38 slidable through a hole in an upwardly extending arm 39 of the bracket 37; and the rear end of which link is connected at the middle point of an equalizing bar 40 the ends of which extend into one or another of pairs of holes arranged in sectors 41, 41, to thereby provide for proper adjustment as the brake shoes become worn; which sectors are fast upon the inner ends of oscillating brake applying shafts 42, 42 supported in brackets 43 carried by the front axle 11, and which rods have brake applying cams 44, 44 at their outer ends. The front wheels of the trailer are provided with brake drums, one of which is shown at 45, within which brake shoes 46, 46 pivotally and non-rotatably supported from the front axle by the arm 47 are disposed; and the free ends of which lie upon opposite sides of the cams 44. Springs 48, 48 hold the brake shoes normally out of contact with the interiors of the brake drums, and a spring 49 surrounds the link 38 and acts under compression between the arm 39 and the equalizing bar 40 to hold the brake applying mechanism in the position in which it is shown in Figures 2 and 4; with the plunger 28 pressed forward and into the cylinder 22, and the forward end of the strut or compression bar or rod 32 close to the rear end of the pull rod 14.

Figure 2:
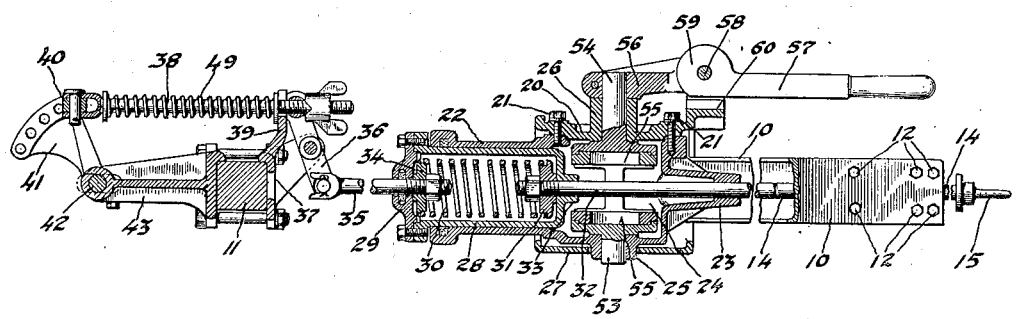
Figure 2 is a fragmentary view showing the principal parts of my improved brake mechanism in section for the most part, upon a vertical central and longitudinally extending plane.

When the tractor is pulling the trailer through the pull rod 14 and draw bars 10, 10 the brake applying mechanism is in the normal position in which it is shown in Figures 2 and 4, with the brakes off and the brake shoes out of contact with the brake drums. If, however, the trailer starts to run forward as when going down hill the front ends of the bars 10, 10 and the spacing blocks 13 will move forward along the pull rod 14, the front end of which is prevented from moving forward by the tractor acting as an abutment.

Figure 3:
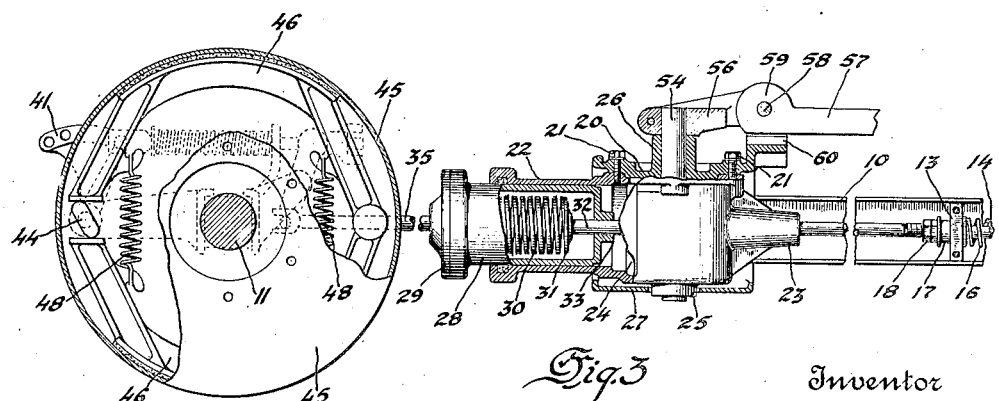
Figure 3 is a view similar to Figure 2 but showing the parts in other positions, and showing also the brake mechanism per se associated with one of the trailer wheels.

The forward movement of the draw bar will result in relative rearward movement of the relatively stationary pull rod 14, the rear end of which now forms an abutment, and, as the trailer continues to move toward the tractor, the strut bar 32 will remain stationary relatively to the forwardly moving trailer; with the result that the spring 30 is compressed by force acting through the abutment 31, the plunger 28 and abutment 34 are moved rearward together, as shown in Figure 3, and force is applied to the brake mechanism through the push rod 35 and brake mechanism above explained to force the brake shoes into contact with the brake drums. During this action it is obvious that rearward movement of the strut member 32 in excess of that required to apply the brakes will be permitted by and will act to compress the spring 30; said spring acting both to prevent injury to the brake mechanism by excessive rearward movement of the strut 32, or excessive forward movement of the trailer, as well also as to secure the application of the brakes through a yielding spring pressure.

Obviously rearward movement of the plunger 28 and of the brake applying rod 35, by whatever agency brought about, will result in the application of the brakes; and obviously also if rearward movement of said plunger and rod is prevented then the brakes cannot be applied, even though the pull rod 14 and strut 32 be moved rearward; as in said second mentioned case rearward movement of said member 32 although it may compress the spring 30 will not bring about the application of the brakes. In order, therefore, to provide for the manual application of the brakes when the tractor is not hauling the trailer, as for the purpose of holding the latter upon an incline; and in order to prevent the application of the brakes when it is required to back the trailer from the tractor, in which case the pull rod 14 and the strut bar 32 will obviously be moved rearward, I provide the following elements and features of my improved brake applying mechanism.

The plunger 28 is provided with a forwardly extending arm 50 having upper and lower rollers 51, 51 at its front end; and 52 designates a cam member located within the chamber 24 and having trunnions 53, 54 supported within the bearings 25, 26 aforesaid, this cam member being provided with elongated recesses 55, 55 in which the rollers 51, 51 may move freely when the parts are in the positions shown in Figures 2 and 4; the plunger being thus free to move so that the brakes will be applied upon forward movement of the trailer as hereinbefore explained.

Fixedly secured upon the upper end of the upper trunnion 54 is an arm 56; and 57 designates an operating handle and latch member pivotally connected at 58 within a recess in the end of the arm, and having a lug portion 59 which, when said member is swung over to the left, Figure 2, and onto the arm 56, enters in between spaced lugs 60 upon the plate 20 and holds the cam member locked in the position in which it is shown in Figures 2 and 4. Figure 2 shows the cam as unlocked and, upon swinging the handle 57 toward the observer, referring to said figure, or downward, referring to Figure 4, the cam 52 will be moved into the position in which it is shown in Figure 5; in which position it may be locked by turning the latch over and onto the top of the arm 56 to bring the lug 59 between other lugs 61 upon the plate 20. During the movement of the cam above referred to the forward ends of the recesses 55 will engage the rollers 51 and force the plunger 28 backward and into the position shown in Figure 5, which movement will be communicated to the rod 35 through the spring 30 thus applying the brakes; the operation above outlined being brought about by manual operation of the cam member through the handle 57 if and when the brakes are to be applied by hand, as will be understood.

If instead of swinging the handle and arm 56 toward the observer, Figure 2, and downward, Figure 4, the arm and handle be moved manually in a reverse direction the cam member will be swung into a position such that the central portions of the recesses 55, which are obviously solid walls, will lie to the rear of the rollers 51; in which position the parts may be locked by swinging the lug 59 in between a third pair of lugs 62 upon the cover plate 20. When the parts are in this position the plunger 28 cannot be moved rearward by the bar 32, because the rollers 51 thereof are stopped by engagement with the bottom walls of the recesses, and the brakes cannot be applied; this being the position into which the parts are moved if and when it is required to back the trailer from the tractor by force communicated to the trailer through the draw bar connecting the two.

Having thus described and explained my invention I claim and desire to secure by Letters Patent:

1. In a device of the class described and in combination with a trailer having a draw bar through which the same may be drawn, brake applying mechanism carried by said draw bar; means carried by said draw bar and acting upon forward movement of the trailer relative to a hauling agency therefor for operating said brake applying mechanism; brake mechanism associated with certain of the wheels of the trailer and adapted to be applied thereto automatically by said brake applying mechanism upon forward movement of the trailer as aforesaid; and a single manually operable member carried by said draw bar and adapted to operate said brake applying mechanism to thereby apply said brake mechanism to said wheels independently of relative movement the trailer and the hauling agency when in one position, and to prevent said brake applying mechanism from applying said brake mechanism to said wheels upon relative movement between the trailer and the hauling agency when in another position.

2. In a device of the class described and in combination with a trailer having a draw bar through which the same may be drawn, brake mechanism associated with the front wheels of the trailer and adapted to be applied thereto automatically upon forward movement of the trailer relative to a hauling agency; brake applying mechanism carried by said draw bar and including a spring through which force is communicated to said brake mechanism to operate the same upon forward movement of the trailer as aforesaid; and a manually operable member carried by said draw bar and adapted to operate said brake applying mechanism or to prevent the operation thereof according to the position into which said manually operable member is moved.

3. In a device of the class described and in combination with a trailer having a draw bar through which the same may be drawn, brake mechanism associated with the front wheels of the trailer and adapted to be applied thereto automatically upon forward movement of the trailer relative to a hauling agency; brake applying mechanism carried by said draw bar and including a spring through which force is communicated to said brake mechanism to operate the same upon forward movement of the trailer as aforesaid; and a manually operable rotatable cam member carried by said draw bar and adapted when in one position to permit the operation of said brake applying mechanism as aforesaid and when in another position to prevent the operation of said mechanism, and to operate said mechanism manually when moved into a third position.

4. In a device of the class described and in combination with a trailer having a draw bar, brake mechanism associated with said trailer and adapted to be applied to certain of the wheels thereof automatically upon forward movement of the trailer relative to a hauling agency; and brake applying mechanism comprising a guide member carried by said draw bar, a plunger movable relative to said guide member, a rearwardly extending brake mechanism operating rod extending through a hole in said plunger and having an abutment at its forward end, a forwardly extending strut bar extending through a hole in said plunger and having an abutment at its rear end, a spring associated with said plunger and acting to force said abutments apart, and a reciprocating push rod at the front end of said draw bar and the rear end of which is adapted to engage the front end of said strut bar and force it rearward upon forward movement of the trailer relative to a hauling agency.

5. In a device of the class described and in combination with a trailer having a draw bar, brake mechanism associated with said trailer and adapted to be applied to certain of the wheels thereof automatically upon forward movement of the trailer relative to a hauling agency; brake applying mechanism comprising a guide member carried by said draw bar, a plunger movable relative to said guide member, a rearwardly extending brake mechanism operating rod extending through a hole in said plunger and having an abutment at its forward end, a forwardly extending strut bar extending through a hole in said plunger and having an abutment at its rear end, a spring arranged between and acting to force said abutments apart, and a reciprocating push rod at the front end of said draw bar and the rear end of which is adapted to engage the front end of said strut bar and force it rearward upon forward movement of the trailer relative to a hauling agency; and a manually operable member carried by said draw bar and adapted to force said plunger rearward when moved in one direction, and to prevent rearward movement of said plunger when moved in another direction.

6. In a device of the class described and in combination with the draw bar of a trailer, a plate carried by said draw bar; a housing carried by said plate and having a rearwardly located guide cylinder and a forwardly arranged strut bar guide; a reciprocating plunger operating within said guide cylinder; a brake applying rod having an abutment within said plunger and extending rearwardly therefrom; a strut bar having an abutment within said plunger and extending forwardly therefrom and through said strut bar guide; a spring located within said plunger and acting to force said abutments apart and against stops at the ends of said plunger; and a reciprocating push rod at the front end of said draw bar and the rear end of which is adapted to engage the front end of said strut bar and force it rearward.

7. In a device of the class described and in combination with the draw bar of a trailer, a plate carried by said draw bar; a housing carried by said plate and having a rearwardly located guide cylinder, a forwardly arranged strut bar guide, and a chamber located between said guide cylinder and strut bar guide; a reciprocating plunger operating within said guide cylinder; a brake applying rod having an abutment within said plunger and extending rearwardly therefrom; a strut bar having an abutment within said plunger and extending forwardly therefrom and through said strut bar guide; a spring located within said plunger and acting to force said abutments apart and against stops at the ends of said plunger; a reciprocating push rod at the front end of said draw bar and the rear end of which is adapted to engage the front end of said strut bar and force it rearward; an arm extending forward from said plunger and into said chamber, and having upper and lower stops spaced apart from one another; a rotatable cam member having trunnions supported in upper and lower bearings provided in said plate and in said housing and having recesses within which said stops may move when said member is in one position, said recesses being of such form that said plunger will be forced rearward when said cam member is moved into another position and will be prevented from moving rearward when said cam member is moved into a third position; and manually operable means for moving said cam member into and for locking it in the three positions aforesaid.

8. In a device of the class described and in combination with a draw bar comprising channel shaped members arranged with their open sides facing one another and having parallel rear portions, inclined intermediate portions, and parallel front ends whereby a hollow housing is provided at said front ends; a reciprocating push bar arranged within said hollow housing and through which the draw bar may be secured to a hauling agency; a plate secured in place upon the upper sides of said channel members and at the inclined portions thereof; a housing secured to the under side of said plate and located between the inclined portions of said channel members, said housing having a rearwardly located guide cylinder, a forwardly arranged strut bar guide, and a chamber located between said guide cylinder and said strut bar guide; a hollow reciprocating plunger operating within said guide cylinder and having a head at both ends thereof, and an arm extending from its front head into the chamber aforesaid; a brake applying rod having an abutment within said plunger, and which rod extends rearwardly through a hole in the rear head thereof; a strut bar having an abutment within said plunger, and which bar extends forwardly through a hole in the forward head thereof and between said channel members and terminates adjacent the rear end of said push bar; a spring located within said plunger and acting between said abutments to force them apart; and a manually operable cam member located within said chamber and adapted when in one position to permit free movement of said plunger, when in another position to engage stops upon the free end of the arm aforesaid and prevent such movement, and when moved into a third position to force said plunger rearward through said stops and said arm.

In testimony whereof I have signed this specification this first day of November, 1922.

JAMES HARRY CLARK.